United States Patent
Ignatyev

(10) Patent No.: US 11,757,990 B2
(45) Date of Patent: Sep. 12, 2023

(54) DATA SYNCHRONIZATION IN A CLOUD COMPUTING ENVIRONMENT

(71) Applicant: ORACLE INTERNATIONAL CORPORATION, Redwood Shores, CA (US)

(72) Inventor: Oleksiy Ignatyev, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 355 days.

(21) Appl. No.: 16/125,899

(22) Filed: Sep. 10, 2018

(65) Prior Publication Data

US 2020/0084270 A1 Mar. 12, 2020

(51) Int. Cl.
| | |
|---|---|
| *H04L 67/1095* | (2022.01) |
| *H04L 67/30* | (2022.01) |
| *G06Q 30/06* | (2023.01) |
| *G06F 16/27* | (2019.01) |
| *G06Q 30/0601* | (2023.01) |

(52) U.S. Cl.
CPC .......... *H04L 67/1095* (2013.01); *G06F 16/27* (2019.01); *G06Q 30/0631* (2013.01); *G06Q 30/0635* (2013.01); *H04L 67/30* (2013.01)

(58) Field of Classification Search
CPC ..... H04L 67/1095; H04L 67/30; G06F 16/27; G06Q 30/0631; G06Q 30/0635
USPC ....................................................... 707/610
See application file for complete search history.

(56) References Cited

U.S. PATENT DOCUMENTS

| | | | |
|---|---|---|---|
| 7,979,310 B2 * | 7/2011 | Pujar | G06Q 40/12 705/26.8 |
| 2007/0043651 A1 * | 2/2007 | Xiao | G06Q 40/025 705/37 |
| 2009/0030906 A1 * | 1/2009 | Doshi | G06F 16/27 |
| 2010/0235431 A1 | 9/2010 | Poluri et al. | |
| 2011/0208695 A1 | 8/2011 | Anand et al. | |
| 2011/0302133 A1 * | 12/2011 | Kuruganti | H04L 67/06 707/608 |
| 2012/0109774 A1 * | 5/2012 | Chernenko | G06Q 30/0611 705/26.4 |
| 2012/0296759 A1 * | 11/2012 | Shechtman | G06Q 30/08 705/26.3 |
| 2013/0275509 A1 | 10/2013 | Micucci et al. | |
| 2016/0292505 A1 * | 10/2016 | Agrawal | G06K 9/00469 |
| 2017/0103441 A1 * | 4/2017 | Kolb | G06F 16/93 |

* cited by examiner

*Primary Examiner* — Mohsen Almani
(74) *Attorney, Agent, or Firm* — Kraguljac Law Group, LLC

(57) ABSTRACT

Systems, methods, and other embodiments that perform data synchronization in a cloud computing environment are described. In one embodiment, a method includes maintaining a plurality of accounts within a cloud computing environment. In response to receiving a command to enable data synchronization for an account, a data synchronization condition is constructed to specify that a synchronization action will be triggered when data input by the account satisfies the data synchronization condition. Access to the account is monitored. In response to the access satisfying the data synchronization condition, the synchronization action is triggered to identify a second account with data corresponding to data input by the account. The synchronization action is executed to create a synchronization field in the second account and insert data of the account into the synchronization field.

16 Claims, 8 Drawing Sheets

DATA SYNCHRONIZATION IN A CLOUD COMPUTING ENVIRONMENT

BACKGROUND

A cloud computing environment, such as a multi-tenant architecture, hosts various services available to users. The users can create accounts with the cloud computing environment in order to subscribe to certain services. For example, a user subscribes to a data storage service, an ecommerce service, and an accounting service through an account with the cloud computing environment. The user can access the services through a computing device that accesses and connects to the cloud computing environment over a network. When the computing device connects to the cloud computing environment for access to a service, computing hardware of the cloud computing environment executes the service. In an example, the service is executed through a virtual machine having access to account data of the account stored within storage of the cloud computing environment. In this way, the computing device has access to the account data and the service executing in the cloud computing environment.

The cloud computing environment provides data security and privacy for each account. In particular, data isolation is provided for each account so that account data of an account cannot be accessed by other accounts. If an account wants to share account data with another account, the account must manually extract the account data from the cloud computing environment. The account can use a third party service, outside of the cloud computing environment, to transmit the data to destination user. The destination user may manually input the data into an account of the destination user. This is very inefficient and wastes substantial amounts of computing resources, network bandwidth, and time.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
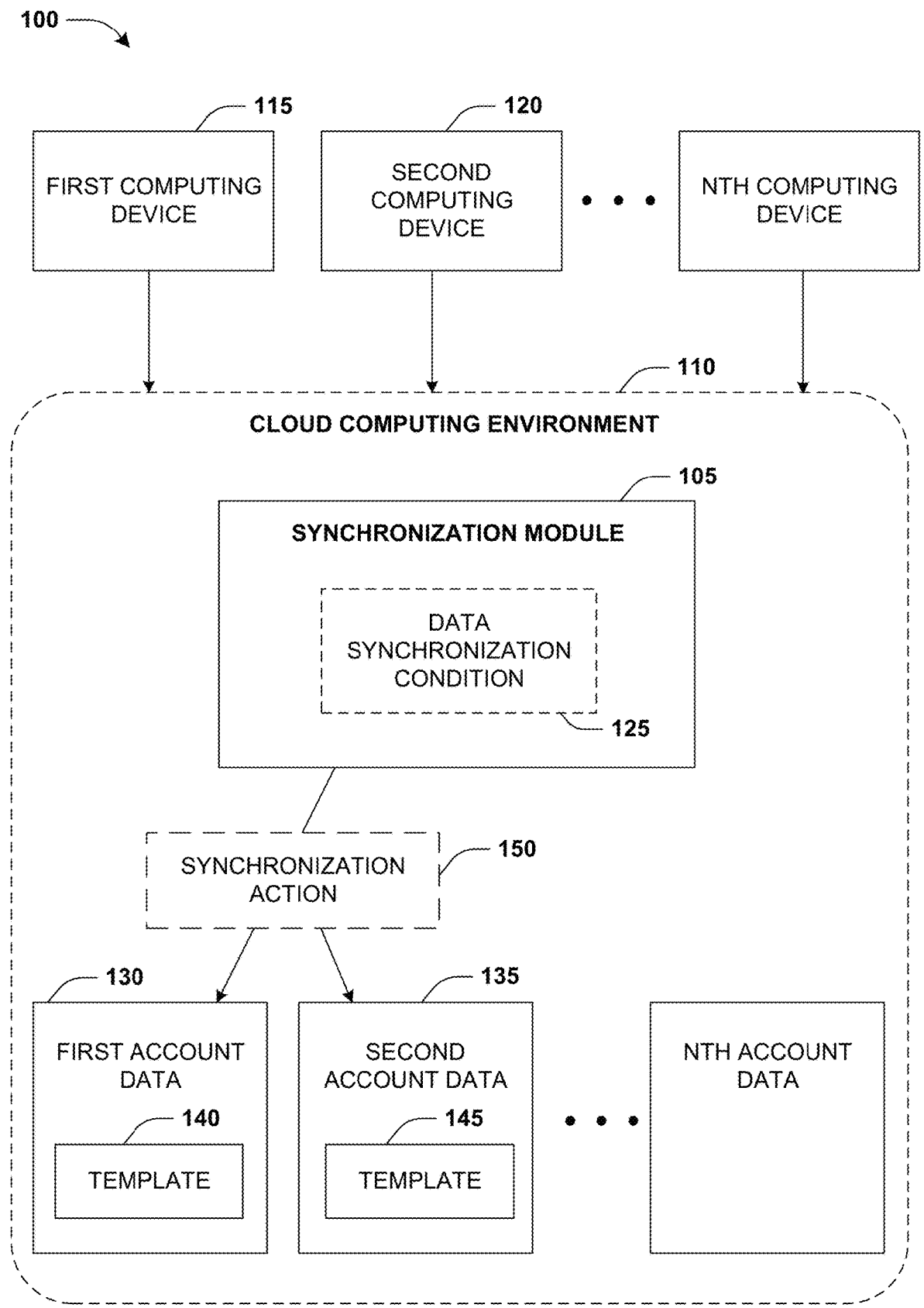
FIG. 1 illustrates an embodiment of a system associated with data synchronization in a cloud computing environment.

Computerized systems and methods are described herein that provide for data synchronization in a cloud computing environment. The present system performs automated data synchronization of data between different accounts within the cloud computing environment. The accounts of the cloud computing environment are separated from one another to provide for data privacy and security. Thus, data of an account is not directly accessible to other accounts. However, there are instances where automatic synchronization and sharing of data between accounts would be beneficial and improve efficiency of the cloud computing environment and remote computers using the cloud computing environment. Accordingly, the present system provides accounts with the ability to define data synchronization conditions that will trigger automated data synchronization within the cloud computing environment. In this way, selective data from one account is automatically synchronized and shared with another account when a data synchronization condition is met.

The data synchronization condition specifies that when certain data is input or certain templates/forms are populated with data by an account, information of the account can be synchronized and shared with other accounts. For example, a user of an account can define the data synchronization condition to specify that a synchronization action will be executed when the account fills in purchase order forms to purchase products. Thus, when the user populates a purchase order form for purchasing a product, the synchronization action is triggered. The synchronization action is executed within the cloud computing environment to evaluate other accounts to identify other accounts selling the product, such as a second account. In one embodiment, only other accounts that provided consent for synchronizing and sharing data are evaluated. Further, the synchronization action is performed within the cloud computing environment to maintain privacy and security.

The synchronization action is executed to generate and add a synchronization field to a data structure within the second account. The generation of the synchronization field may correspond to filling in an already existing file or template form or the creation of a new file or template form within second account data. For example, contact information about a first account, purchase order information, and/or new data may be inserted into the synchronization field in the second account. Thus the data from the first account is visible and shared with the second account via the synchronization field. In one embodiment, the new data could correspond to a programmatically generated new sales order that is populated with purchase order information from the purchase order form by the synchronization action. In this way, data is synchronized and shared between the account and the second account.

Automatic data synchronization between accounts synchronizes only certain specified data when the user defined data synchronization condition is met while other data of the account remains secure and private. Automatic data synchronization not only maintains security and privacy, but also improves the efficiency of the cloud computing environment and computer using the cloud computing environment. Conventional cloud computing environments do not provide for automated sharing of data between accounts because all account data is kept private and separate from other accounts. Thus, an account would have to waste computing resources and time to manually extract data from the cloud computing environment and transmit the data through a third party service separate from the cloud computing environment to a second user. The second user would have manually enter the data into a second account within the cloud computing environment. This process wastes computing resources, network bandwidth, and time. Accordingly, the present system solves these technical inefficiencies by automatically performing a synchronization action to synchronize and share data between accounts when a synchronization condition is met.

With reference to FIG. 1, one embodiment of a system 100 is illustrated that is configured to perform data synchronization in a cloud computing environment 110. A more detailed description is provided with reference to FIG. 2. The system 100 includes a synchronization module 105. The synchronization module 105 is part of the cloud computing environment 110. The cloud computing environment 110 comprises computers configured to execute services subscribed to by accounts of users. The cloud computing environment 110 stores account data of the accounts within storage devices accessible to the computers. For example, first account data 130 of an account, second account data 135 of a second account, and/or other account data of other accounts is stored within the cloud computing environment 110. Data security and privacy is provided for the account data. In particular, account data of an account is isolated and inaccessible to other accounts.

An account, account data, and services subscribed to through the account are accessible through the cloud computing environment 110 to remote computing devices over a network. For example, the account is accessible from a first computing device 115. The second account is accessible from a second computing device 120. In this way, a user can use a remote computing device to establish a connection with the cloud computing environment 110 over a network and securely log into an account.

The synchronization module 105 allows users to define data synchronization conditions that trigger automatic execution of synchronization actions to synchronize and share data between accounts. In one embodiment, the synchronization module 105 receives a command from the first computing device 115 accessing the account. The command specifies that data synchronization of the account is to be enabled when certain conditions are met. The conditions may specify that when data is input into service request templates of the first account data 130, the inputted data and contact information of the account is to be shared with other accounts having similar types of templates filled out with corresponding service availability information. For example, a template 140 corresponds to a house cleaning request template that can be filled out with information regarding the user seeking a house cleaning service. A similar type of template may relate to a template filled out with house cleaning service availability information. In this way, the command indicates that when service request information is stored into the first account data 130 of the account, the service request information should be synchronized and shared with other accounts having account data comprising service availability information.

Based upon the command, the synchronization module 105 constructs a data synchronization condition 125. The data synchronization condition 125 specifies that a synchronization action 150 will be triggered when data input by the account satisfies the data synchronization condition 125. For example, the data synchronization condition 125 is met when the template 140 is populated with information relating to seeking house cleaning services. The synchronization action 150 would identify other accounts comprising house cleaning availability information, and would share information of the account with the other accounts. The synchronization action 150 may also share information of those other accounts with the account.

Once the data synchronization condition 125 is constructed, access by the first computing device 115 to the account within the cloud computing environment 110 is monitored. For example, the first computing device 115 accesses an instance of an application hosted by the cloud computing environment 110. The user can access the first account data 130 using the application, such as to fill out the template 140 with information about seeking house cleaning services. Based upon the monitoring, the synchronization module 105 may determine that data being input into the template 140 satisfies the data synchronization condition 125.

In response to the data synchronization condition 125 being satisfied, the synchronization action 150 is triggered to execute within the cloud computing environment 110. The synchronization action 150 is executed to evaluate account data of other accounts to identify any accounts that have data corresponding to the data input into the account. That is, the synchronization action 150 evaluates account data to identify accounts with account data indicating that the accounts offer house cleaning services. For example, the synchronization action 150 evaluates the second account data 135 of the second account. The synchronization action 150 may determine that a template 145 comprising house cleaning service information corresponds to the data input by the account into the template 140 regarding seeking house cleaning services.

In response to determining that the second account comprises the template 145 corresponding to the template 140, the synchronization action 150 is executed to perform various actions. In one embodiment, the synchronization action 150 creates and adds a synchronization field in the second account data 135 (e.g., into a data structure defining the second account). The synchronization action 150 copies specified data from the account and inserts the data into the synchronization field in the second account to synchronize and share data between the account and the second account. Once the copied data (from first account) is inserted into the second account, the copied data is visible to any user that has access to the second account. Thus the data is shared between accounts. The data may comprise contact information of the account, data input into the template 140, etc. In another embodiment, the synchronization action 150 is executed to create a second synchronization field in the first account data 130 of the account. The synchronization action 150 can populate the second synchronization field with information about the second account, such as contact information or information within the template 145.

Automated synchronization and sharing of data between accounts within the cloud computing environment 110 improves the efficiency of the cloud computing environment 110 and remote computers accessing the cloud computing environment 110. In particular, conventional cloud computing environments do not provide for automated synchronization and sharing of data that is triggered when data synchronization conditions are satisfied. Instead, account data is kept isolated and separate amongst accounts. In order to share data, an account must extract data from a conventional cloud computing environment, transmit the data such as through a third party service outside the conventional cloud computing environment to a second account, and the second account must manually enter the data into second account data of the second account. The present system improves upon conventional cloud computing environments by automatically synchronizing and sharing data between accounts within a cloud computing environment in response to data synchronization conditions being met.

Figure 2:
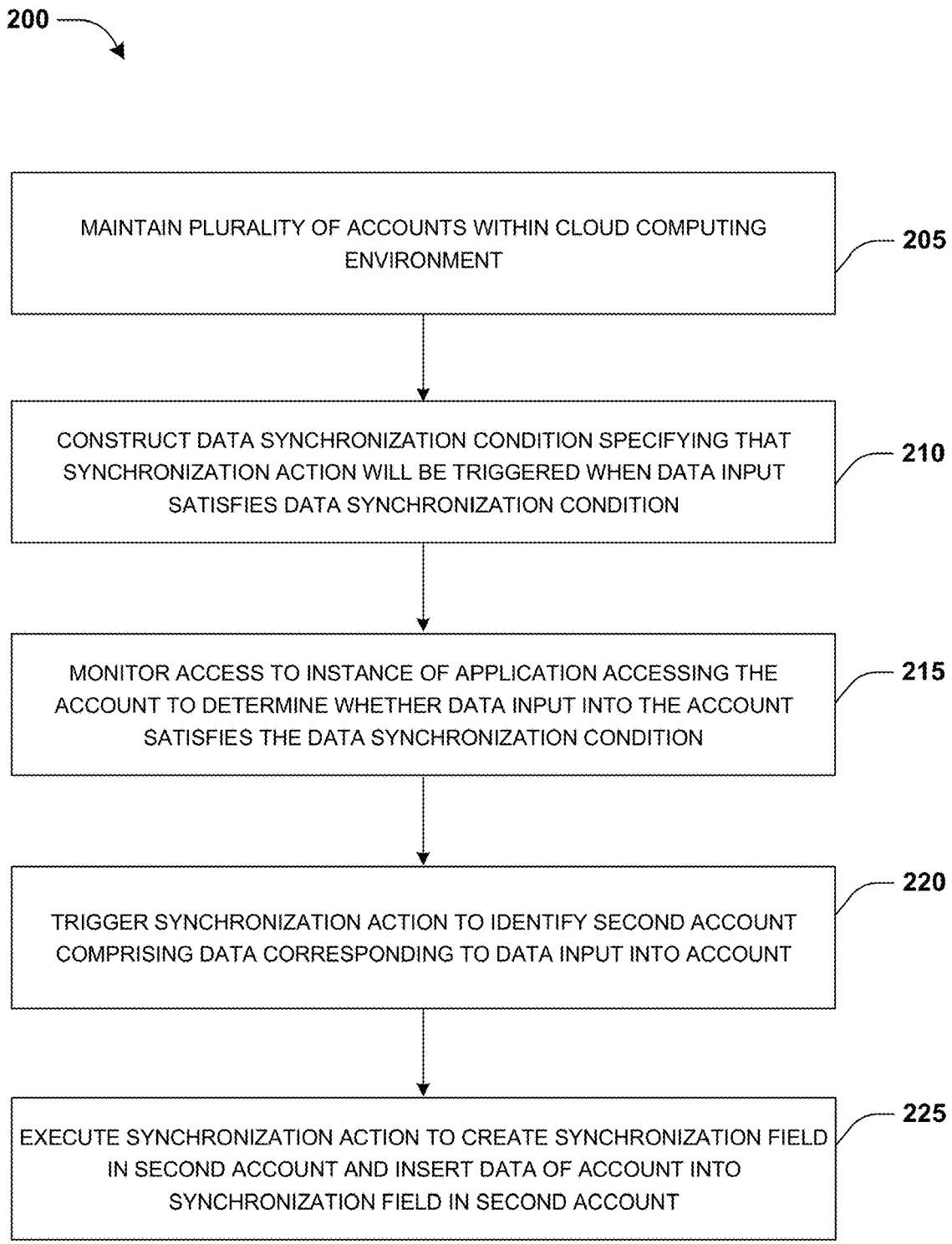
FIG. 2 illustrates an embodiment of a method associated with data synchronization in a cloud computing environment.

With reference to FIG. 2, one embodiment of a computer implemented method 200 that performs data synchronization in a cloud computing environment is illustrated. In one embodiment, the method 200 is performed by the synchronization module 105 and system 300 of FIGS. 3A and 3B utilizing various computing resources of a computer that is configured as a special purpose machine to implement the disclosed features in one or more combinations, and/or other computers similarly configured. The computing resources, such as a processor, are used for executing instructions associated with executing a synchronization action. Memory and/or disks are used for storing instructions that are executed by the synchronization module 105 to execute the synchronization action. A network device is used for receiving and monitoring access by a remote computer to the cloud computing environment. The method 200 is triggered upon receiving a command to enable data synchronization amongst accounts of the cloud computing environment.

Figure 3A:
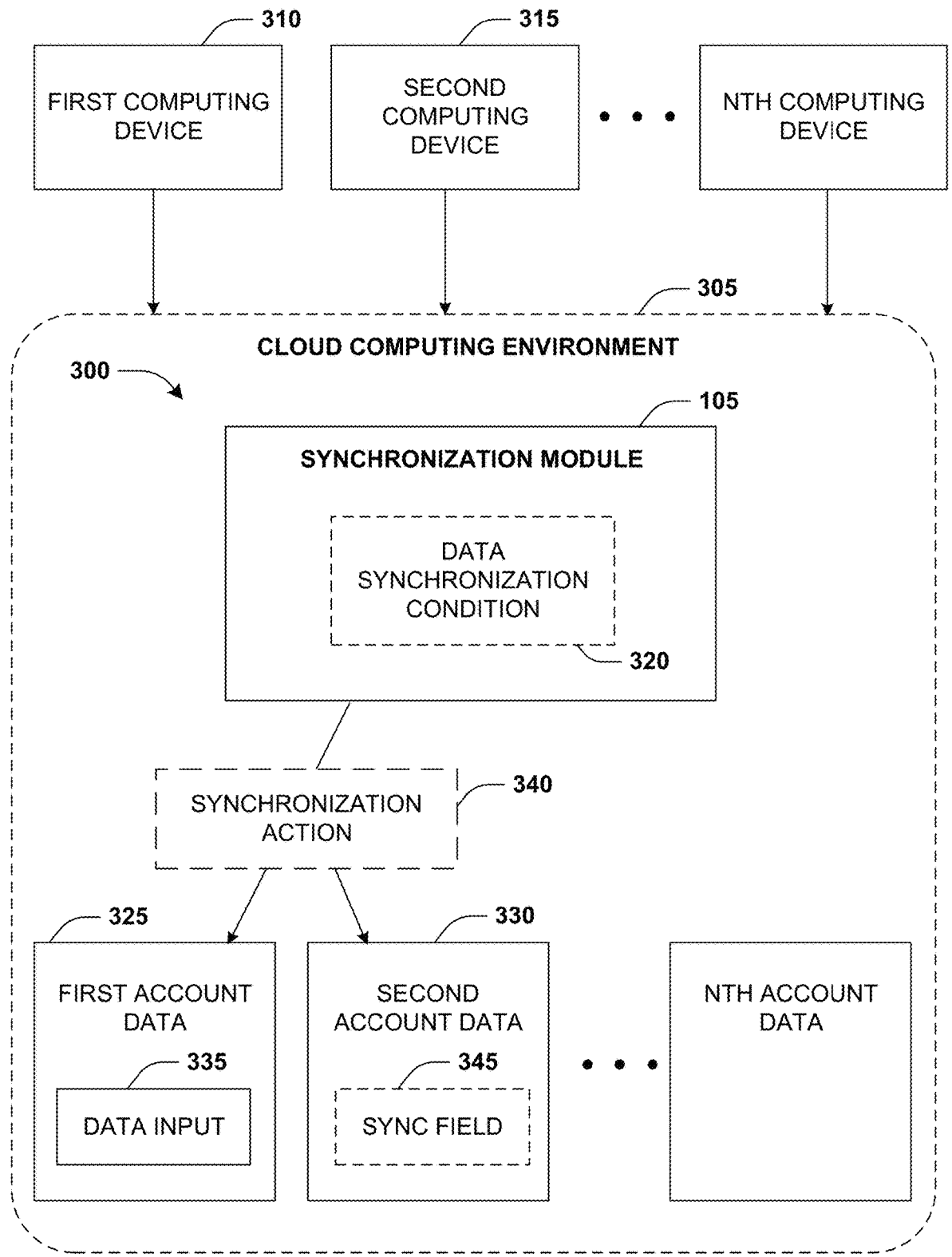
FIG. 3A illustrates an embodiment of a system associated with data synchronization in a cloud computing environment, where a synchronization field is created in second account data.

At 205, a plurality of accounts are maintained within a cloud computing environment 305, as illustrated by FIG. 3A. The cloud computing environment 305 provides remote computers with access over a network to the plurality of accounts maintained by the cloud computing environment 305. The remote computers can access the accounts through instances of applications hosted by the cloud computing environment 305. For example, a first account may subscribe to a financial service hosted by the cloud computing environment 305. A first computing device 310 can access the first account and financial service through a first instance of a financial application hosted by the cloud computing environment 305. A second account may also subscribe to the financial service. A second computing device 315 can access the second account and the financial service through a second instance of the financial application hosted by the cloud computing environment 305. Computers of the cloud computing environment 305 execute the instances of the financial application, such as through separate virtual machines. In one embodiment, the cloud computing environment 305 comprises a multi-tenant architecture. The accounts corresponds to tenants of the multi-tenant architecture.

The cloud computing environment 305 stores account data of each account within storage of the cloud computing environment 305. In one embodiment, first account data 325 is maintained for the first account and second account data 330 is maintained for the second account within storage of the cloud computing environment 305. The account data of each account is inaccessible to other accounts. In this way, each account is isolated from accessing data of other accounts. Maintaining separation of account data improves security and privacy of each account's data. There are instances where synchronizing and sharing data between accounts would improve efficiency the cloud computing environment 305 and remote computers using the cloud computing environment 305. In particular, automatic identification and synchronizing/sharing of data when data synchronization conditions are met will reduce the amount of computing resources and bandwidth utilization. Otherwise computing resources and bandwidth are wasted by extracting account data, externally sharing the account data outside the cloud computing environment 305, and manually inputting the shared account data into other accounts of the cloud computing environment 305.

At 210, a command is received from a remote computer to enable data synchronization of an account. In one embodiment, the first computing device 310 transmits the command to enable data synchronization for the first account. The command may specify that when certain data is input into the first account data 325, then a synchronization action is to be performed. Based upon the command, the synchronization module 105 constructs a data synchronization condition 320 specifying that a synchronization action 340 will be triggered when data input by the first account satisfies the data synchronization condition 320. In one embodiment, a privacy restriction is enforced upon the synchronization action 340. The privacy restriction specifies that only certain information of the first account is to be synchronized/shared with other accounts, while other information is not allowed to be synchronized/shared with other accounts. In this way, privacy and data security is maintained.

In one embodiment, the data synchronization condition 320 specifies that the synchronization action 340 is to be triggered when certain data fields of a template form are populated by the first account within the first account data 335. For example, the data synchronization condition 320 will trigger the synchronization action 340 when the first account fills out a financial form seeking financial services. A privacy restriction may specify that data input into the financial form and contact information of the first account is allowed to be shared with other accounts, but other data of the first account data 325 is not allowed to be shared. The synchronization action 340 may be defined to evaluate account data of other accounts to identify data matching the data input into the financial form. For example, matching data may be a financial services form indicating that another account provides similar financial services being sought by the first account.

It may be appreciated that a wide variety of data synchronization conditions can be specified. In one example, the creation of a new file such as the creation of a resume triggers a synchronization action. In another example, certain types of data input and saved to the first account data 325 triggers a synchronization action, such as input of information regarding obtaining a line of credit. A variety of synchronization actions can be defined and executed. In one example, a synchronization action specifies that when a particular template is filled out by an account, data of the template is shared with another account having a similar or corresponding template filled out. For example, when an account fills out a purchase order for an item, information of the purchase order is shared with other accounts having account data indicating that those accounts are selling the item. In another example, a synchronization action specifies that new data is to be created is another account, such as the creation of a new sales order based upon the information from the purchaser order. In yet another example, a synchronization action generations recommendations based upon the data input into the first account, such as a recommendation of vendors selling the item or a recommendation to vendors of the first account as a potential buyer.

At 215, access by the first computing device 310 to the instance of the financial application accessing the first account is monitored. The access is monitored to determine whether data input 335 into the first account satisfies the data synchronization condition 320. In one embodiment, the data input 335 satisfies the data synchronization condition 320 when the data input 335 populates particular data fields of a template form with certain data values. For example, the data synchronization condition 320 is satisfied when the financial form is filled out with information regarding a type of service sought, a budget for the service, and a date of service.

At 220, the synchronization action 340 is triggered based upon the data synchronization condition 320 being satisfied. The synchronization action 340 is executed to evaluate data associated with the plurality of accounts maintained with the cloud computing environment 305. Because the synchronization action 340 is internally executed within the cloud computing environment 305, there is no loss of privacy or data security of the accounts. Furthermore, in one embodiment, only accounts that have enabled data synchronization and sharing are evaluated. Thus, accounts can opt-out of having their account data evaluated for data synchronization and sharing.

The synchronization action 340 is executed to identify accounts comprising account data that correspond to the data input 335 into the first account data 325. In particular, the synchronization action 340 extracts the data values input 335 into the data fields of the financial form, such as the type of service sought, the budget, and the date of service. The synchronization action 340 parses files, forms, templates, and/or other data of the other accounts to determine whether any of the other accounts have data corresponding to the data values. In one embodiment, template forms filled out by the other accounts are evaluated to identify a template form having data fields populated with data values matching the data values inputted 335 into the data fields of the financial form within a matching threshold. The matching threshold may specify that a certain number of data values should exactly match or have values within a certain threshold. The threshold could be a price threshold of being within $100 of the budget, availability to perform the service within a few days of the date of service, etc. Thus, data values of data fields may either have to exactly match between the forms or merely be within the matching threshold.

In one embodiment, the second account data 330 is determined to have data corresponding to the data input 335 within the matching threshold. For example, the second account data 330 comprises a file listing services provided by the second account. The file may specify that the second account provides a similar service within a threshold amount of the budget specified by data input 335 into the financial form. The file may also specify that the service is available during a time frame of the date of service sought by the first account.

At 225, the synchronization action 340 is executed to create a synchronization field 345 in a data structure of the second account data 330 of the second account. In one embodiment, the synchronization field 345 may comprise new data such as a newly created file or template form. In another embodiment, the synchronization field 345 may correspond one or more data values filled into existing data fields or template forms. The synchronization action 340 copies specified data from the first account and inserts the data into the synchronization field 345 in the second account data 330 to synchronize and share the data between the first account and the second account. As previously stated, once the copied data (from first account) is inserted into the data structure/record of the second account, the copied data is visible to any user that has access to the second account. Thus the data is shared between accounts.

In one embodiment, the data input 335 into the financial form and contact information of the first account is populated into a new form such as a new notification message within the second account data 330 for access by the second account. The new notification message may specify that the first account is seeking the type of service input 335 into the financial form by the first account. Certain information of the data input 335 may be included or excluded, such as where the budget is excluded but the date of service is included. For example, the command specifies and/or the synchronization action 340 is defined with what type of data is allowed to be shared and what type of data is not to be shared. When the second account is accessed by the second computing device 315, the synchronization field 345 such as the new notification message will be accessible through the second account data 330.

Figure 3B:
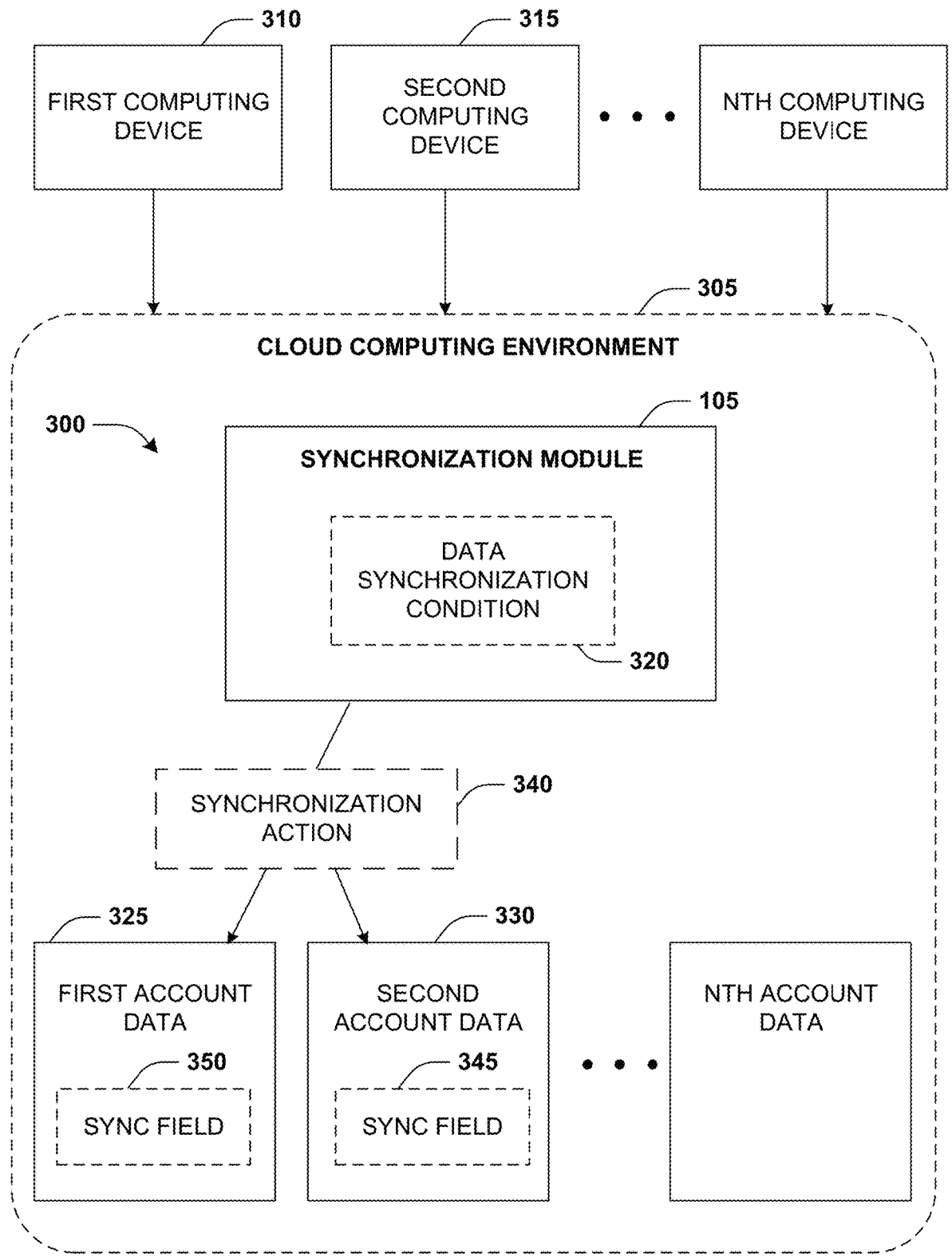
FIG. 3B illustrates an embodiment of a system associated with data synchronization in a cloud computing environment, where a second synchronization field is created in first account data.

In one embodiment, a second synchronization field 350 is created within the first account data 325, as illustrated by FIG. 3B. The second synchronization field 350 is populated with information from the second account data 330. For example, the second synchronization field 350 is populated with information from the file listing the services provided by the second account and sought by the first account. The second synchronization field 350 may be populated with contact information of the second account. In one embodiment, the second synchronization field 350 is only created if the second account provides consent for such information to be synchronized and shared with other accounts.

In one embodiment of synchronizing account data between accounts, the first account inputs sales data into the first account data 325. The sales data describes an item or service for sale by the first account. The input of the sales data may satisfy a data synchronization condition specifying that the input of sales information is to be synchronized and shared with other accounts seeking the item or service for sale by the first account. A recommendation to purchase the item from the first account may be inserted into synchronization fields generated within account data of the other accounts. When a remote computer accesses one of the accounts through an instance of an application, the recommendation is rendered through the instance of the application.

In another embodiment of synchronizing account data between accounts, the first account inputs purchase data into the first account. The purchase data describes an item or service that is sought by the first account. The input of the purchase data may satisfy a data synchronization condition specifying that the input of information about purchasing an item or service is to be synchronized and shared with other accounts selling the item or service sought by the first account. A recommendation to sell the item to the first account may be inserted into synchronization fields generated within account data of the other accounts. When a remote computer accesses an account through an instance of an application, the recommendation is rendered through the instance of the application.

In another embodiment of synchronizing account data between accounts, the first account inputs data into a purchasing template (e.g., a purchase order template) for purchasing 200 coffee cups within the next month at a price range between $10 and $15. The input into the purchasing template may satisfy a data synchronization condition specifying that the input of information into purchasing templates is to be synchronized and shared with other accounts selling the item or service sought by the first account. A synchronization action is triggered to identify a seller template (e.g., a sales order template), of a third account, matching the purchasing template information above a matching threshold. For example, the seller template may specify that the third account is selling up to 500 coffee cups at $9.50 for the next 3 weeks. The seller template may not exactly match but may match within the matching threshold. The first account and the third account may have enabled automatic transaction processing. Accordingly, the synchronization module 105 creates a purchase order and sales order within the first account data 325 of the first account and third account data of the third account. The synchronization module 105 generates a command that causes operation of a machine to pack a quantity of the item specified by the purchasing template for shipping to an address specified by the purchasing template. For example, the command comprises instructions that controls one or more warehouse machines to physically pack 200 coffee cups into a package, create and apply a shipping label to the package, and transport the package to a shipping area. The command is transmitted over a network to the one or more warehouse machines for execution.

In another embodiment of synchronizing account data between accounts, data input by the first account into the first account data 325 is evaluated to determine that the data input corresponds to a purchase order for an item. The data input satisfies a data synchronization condition that triggers a synchronization action to be executed. The synchronization action evaluates data of other accounts to determine that fourth account data of a fourth account indicates that the fourth account is selling the item. Information of the purchase order and contact information of the first account is inserted into a synchronization field generated within the fourth account data. For example, a new sales order is generated in the synchronization field, and is populated with information from the purchase order. In one embodiment, the synchronization field is generated if the fourth account is selling at least a requested quantity of the item requested by the purchase order. In another embodiment, the synchronization field is created if the fourth account data indicates that the fourth account is shipping the item within a shipping timeframe specified by the purchase order. A second synchronization field may be generated within the first account data 325 to indicate that the fourth account is selling the item. Contact information of the fourth account may be inserted into the second synchronization field.

In another embodiment of synchronizing account data between accounts, data input by the first account into the first account data 325 is evaluated to determine that the data input corresponds a sales order to sell an item. The data input satisfies a data synchronization condition that triggers a synchronization action to be executed. The synchronization action evaluates data of other accounts to determine that fifth account data of a fifth account indicates that the fifth account is looking to purchase the item. Information of the sales order and contact information of the first account is inserted into a synchronization field generated within the fifth account data. For example, a new purchase order is generated in the synchronization field, and is populated with information from the sales order. In one embodiment, the synchronization field is generated if the first account is selling at least a requested quantity of the item sought by the fifth account. In another embodiment, the synchronization field is created if the first account data 325 indicates that the first account is shipping the item within a shipping timeframe requested by the fifth account. A second synchronization field may be generated within the first account data 325 to indicate that the fifth account is looking to purchase the item. Contact information of the fifth account may be inserted into the second synchronization field.

In another embodiment of synchronizing account data between accounts, data input into the first account specifies that the first account has an interest in an item or service. The data input satisfies a data synchronization condition that triggers a synchronization action to be executed. The synchronization action may broadcast the interest to one or more accounts of the cloud computing environment 305 based upon the accounts comprising data indicating that the accounts offer the item or service.

Automated synchronization and sharing of data between accounts within the cloud computing environment improves the efficiency of the cloud computing environment and remote computers accessing the cloud computing environment. In particular, conventional cloud computing environments do not provide for automated synchronization and sharing of data that is triggered when data synchronization conditions are satisfied. Instead, account data is kept separate amongst accounts. In order to share data, an account must extract data from a conventional cloud computing environment, transmit the data such as through a third party service outside the conventional cloud computing environment to a second account, and the second account must manually enter the data into second account data of the second account. The present system improves upon conventional cloud computing environments by automatically synchronizing and sharing data between accounts within a cloud computing environment in response to data synchronization conditions being met.

Figure 4:
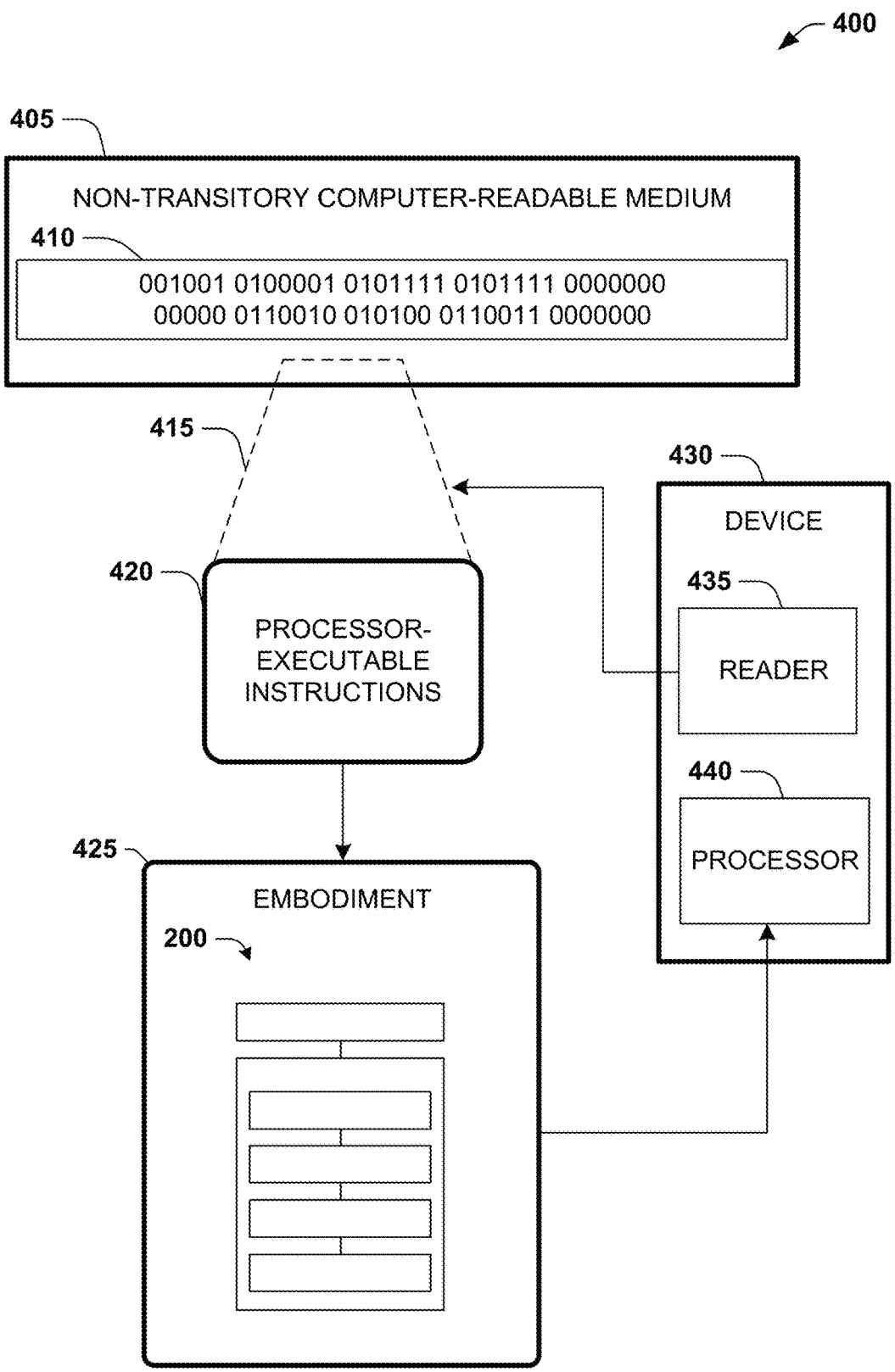
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the synchronization module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the synchronization module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
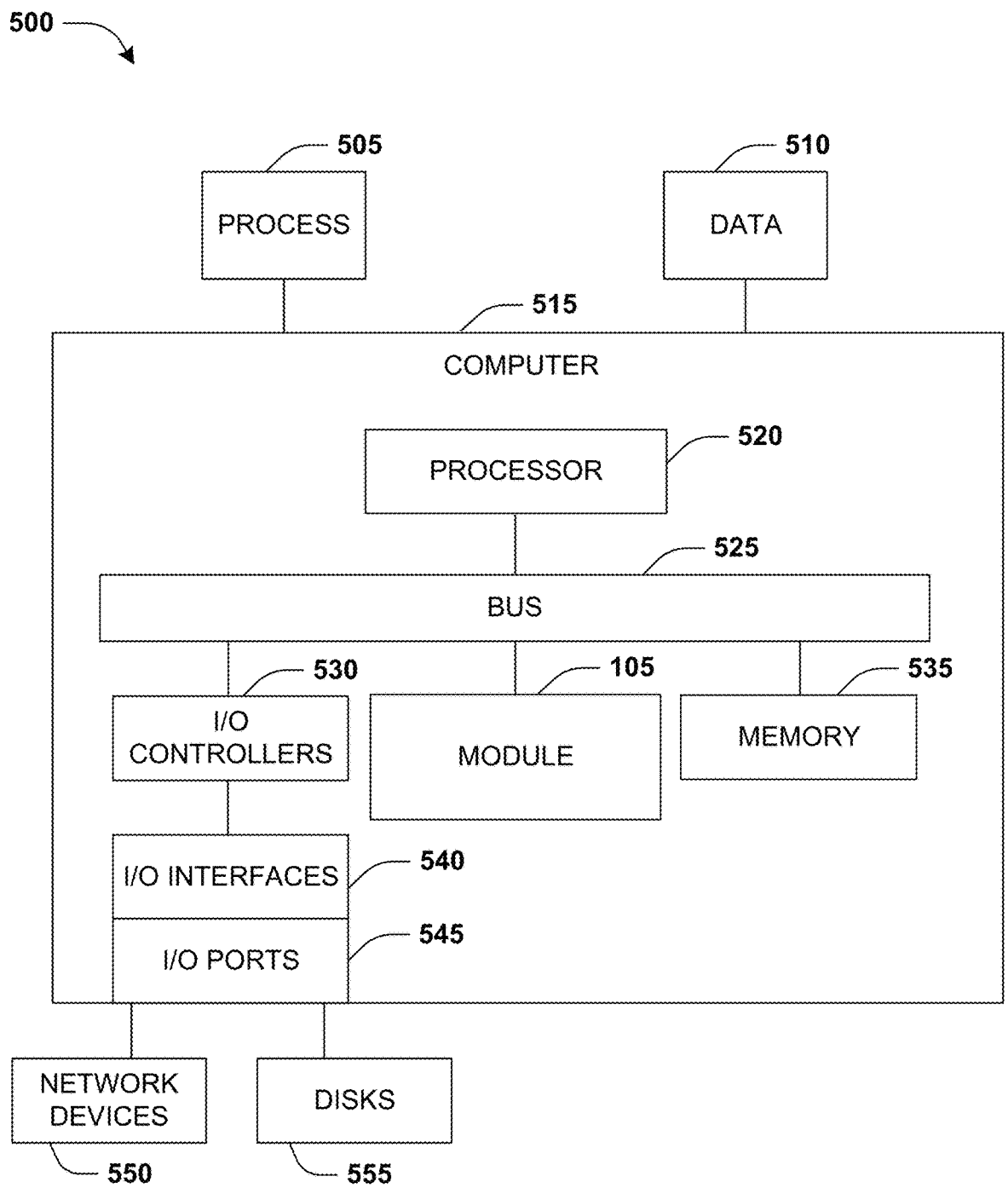
FIG. 5 illustrates an embodiment of a computing system configured with the example systems and/or methods disclosed.

FIG. 5 illustrates one embodiment of a computing system 500 that is configured and/or programmed with one or more of the example systems and methods described herein, and/or equivalents to create a special purpose computer. The computing system 500 may include at least the computer 515 that includes a processor 520, a memory 535, and I/O ports 545 operably connected by a bus 525. In one embodiment, the computer 515 may include logic of the synchronization module 105 configured to facilitate the system 100 and/or the method 200 shown in FIGS. 1-2. In different embodiments, the logic of the synchronization module 105 may be implemented in hardware, a non-transitory computer-readable medium 505 with stored instructions, firmware, and/or combinations thereof. While the logic of the synchronization module 105 is illustrated as a hardware component attached to the bus 525, it is to be appreciated that in other embodiments, the logic of the synchronization module 105 could be implemented in the processor 520, stored in memory 535, or stored in disk 555.

In one embodiment, logic of the synchronization module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the synchronization module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
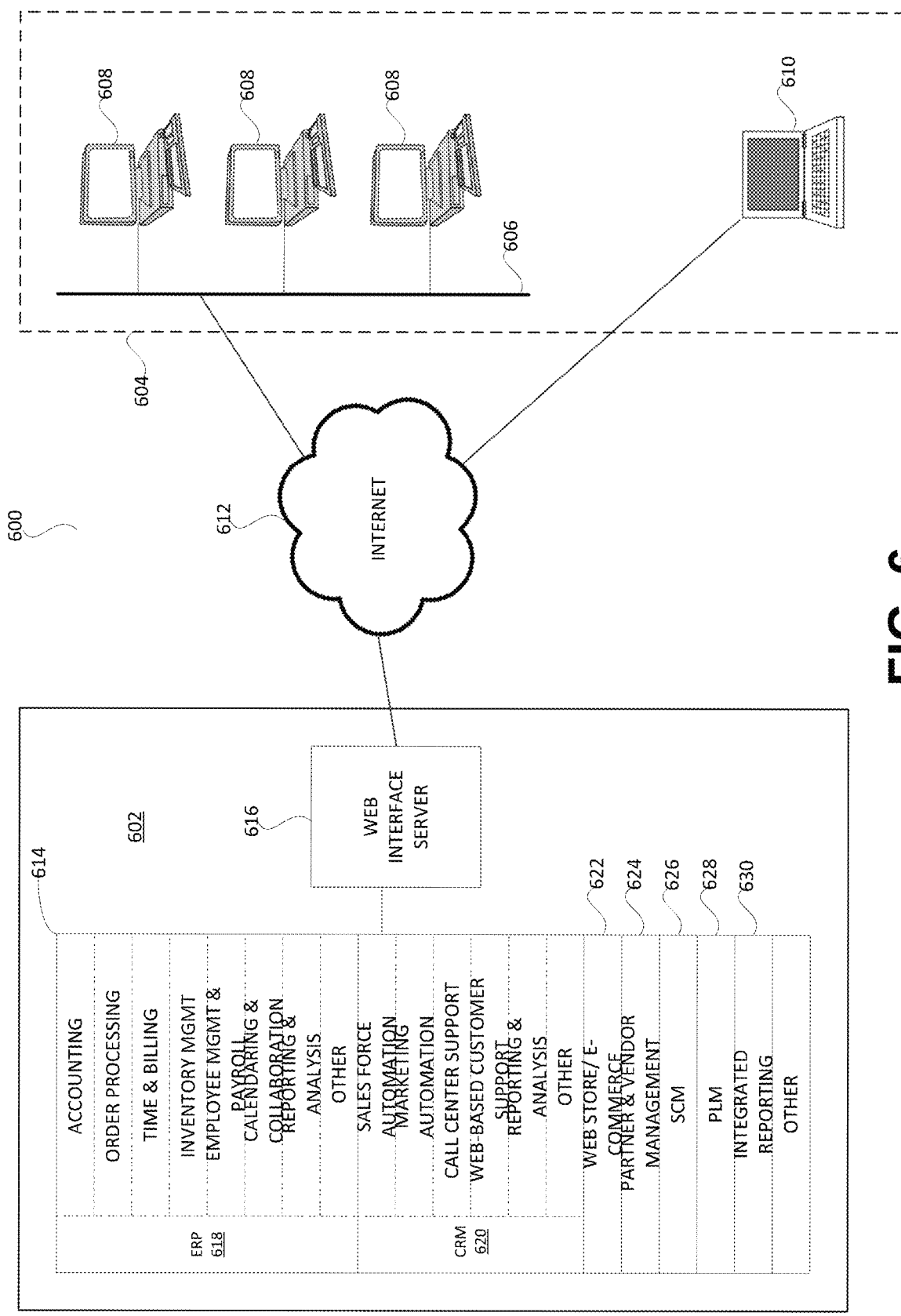
FIG. 6 illustrates an embodiment of an integrated business system and an enterprise network in which an embodiment of the present systems or methods may be implemented.

FIG. 6 is a diagram illustrating a system 600 in which an embodiment of the present system and/or methods may be implemented. Enterprise network 604 may be associated with a business enterprise, such as a retailer, merchant, service provider, or other type of business. The enterprise network 604 may correspond to the cloud computing environment 110. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. For example, the server comprises the computer 515 of FIG. 5. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
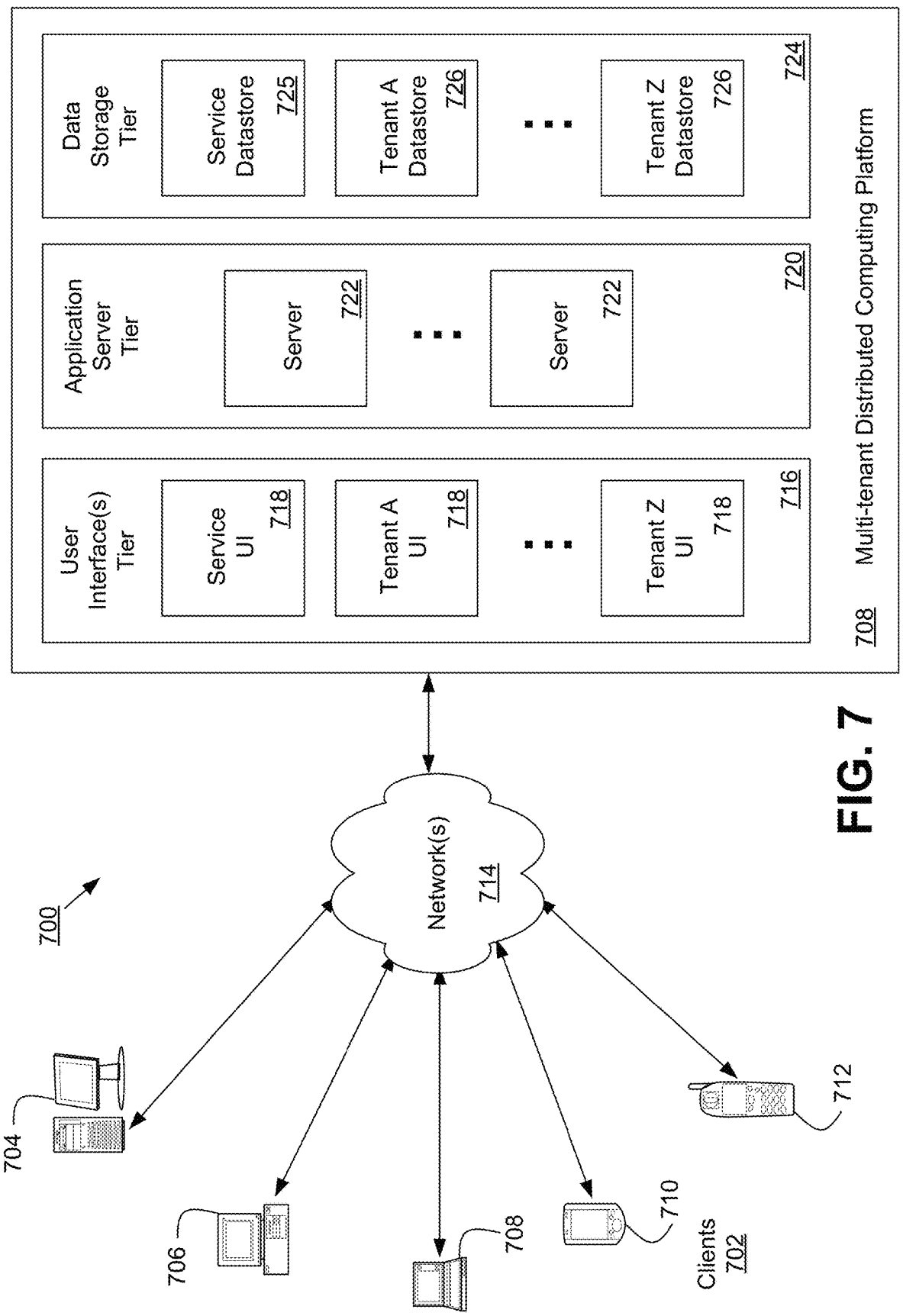
FIG. 7 illustrates an embodiment of a multi-tenant distributed computing service platform.

FIG. 7 is a diagram illustrating elements or components of an example operating environment 700 in which an embodiment of the systems and/or methods described herein may be implemented. As shown, a variety of clients 702 incorporating and/or incorporated into a variety of computing devices may communicate with a distributed computing service/platform 708 through one or more networks 714. The distributed computing service/platform may correspond to the cloud computing environment 110. In one example, a client may incorporate and/or be incorporated into a client application (e.g., software) implemented at least in part by one or more of the computing devices.

Examples of suitable computing devices include specially programmed or configured personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/ material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720. For example, the one or more servers 722 comprise the computer 515 of FIG. 5.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
    maintain a plurality of accounts within a cloud computing environment, wherein a plurality of remote computers is provided with access over a network to the plurality of accounts through instances of an application hosted by the cloud computing environment, and wherein each account is isolated from accessing data of the other accounts;
    in response to receiving a command from one of the plurality of remote computers to enable data synchronization between a first account and the other accounts from the plurality of accounts, construct a data synchronization condition specifying that a synchronization action will be triggered when data input into data fields of a first template form of the first account satisfies the data synchronization condition;
    wherein the first template form comprises a purchase order document;
    monitor access by the one of the plurality of remote computers to an instance of the application accessing the first account to determine whether the data input into the first template form of the first account satisfies the data synchronization condition;
    in response to the data synchronization condition being satisfied, trigger the synchronization action to parse and evaluate data associated with the plurality of accounts to identify a second account that includes data, which matches within a threshold, the data input into the first template form of the first account;
    upon determining that the second account includes data which matches the data input into data fields of the first template form within the threshold, execute the synchronization action to generate a new synchronization field in a data structure included in the second account in order to synchronize and share selected data from the data input between the first account and the second account;
    insert the shared selected data from the first template form into the new synchronization field within the second account;
    in response to the shared selected data being inserted into the new synchronization field, programmatically generate a new file, that is not a data record in a database, in the second account and configure the new file as a sales order document;
    populate the new file with the shared selected data from the new synchronization field that is shared from the first account;
    populate the new file with additional content to generate and configure the new file as the sales order document;
    upon generating the new file in the second account, execute the synchronization action to generate a second synchronization field within the first template form of the first account;
    populate the second synchronization field with information from the second account; and
    transmit a command over the network to a machine, wherein the command causes operation of the machine to pack a quantity of an item specified by the purchase order document for shipping to an address specified by the purchase order document.

2. The non-transitory computer-readable medium of claim 1, wherein the instructions for executing the synchronization action comprise instructions to:
    provide a notification message that the first account is attempting to insert the shared selected data from the first template form of the first account into the new synchronization field in the second account such that the notification message can be accessed by the second account;
    determine if the shared selected data from the first template form of the first account that is inserted into the new synchronization field in the second template form of the second account is allowed to be synchronized with the second account;
    upon determining that the shared selected data to be inserted from the first template form of the first account into the new synchronization field in the second template form of the second account is allowed, insert the shared selected data from the first template form of the first account into the new synchronization field in the second template form of the second account;
    upon the second account providing consent that information is to be synchronized and shared with other accounts:
        (i) execute the synchronization action to generate a second synchronization field within the first template form of the first account; and
        (ii) insert at least contact information from the second account into the second synchronization field within the first template form of the first account to share at least the contact information with the first account; and
    wherein the instructions to programmatically generate the new document in the second account comprises instructions to:

populate the new document with the shared selected data from the data input through the instance of the application.

3. The non-transitory computer-readable medium of claim 1, wherein the instructions comprise instructions to:
generate a recommendation of an item or service for sale by the first account; and
render the recommendation to the second account through a second instance of the application accessed by a second remote computer over a network connection to the cloud computing environment.

4. The non-transitory computer-readable medium of claim 1, wherein the instructions comprise instructions to:
generate a recommendation of an item or service that the first account is seeking to purchase; and
render the recommendation to the second account through a second instance of the application accessed by a second remote computer over a network connection to the cloud computing environment.

5. A computing system of a computing node, comprising:
a processor connected to memory; and
a synchronization module stored on a non-transitory computer readable medium and configured with instructions that when executed by the processor cause the processor to:
maintain a plurality of accounts within a cloud computing environment, wherein a plurality of remote computers is provided with access over a network to the plurality of accounts through instances of an application hosted by the cloud computing environment, and wherein each account is isolated from accessing data of the other accounts;
in response to receiving a command from one of the plurality of remote computers to enable data synchronization between a first account and the other accounts from the plurality of accounts, construct a data synchronization condition specifying that a synchronization action will be triggered when data input into a first template form of the first account satisfies the data synchronization condition;
monitor access by the one of the plurality of remote computers to an instance of the application accessing the first account to determine whether the data input into the first template form of the first account satisfies the data synchronization condition;
in response to the data synchronization condition being satisfied, trigger the synchronization action to parse and evaluate data associated with the plurality of accounts to identify a second account that includes data, which matches within a threshold, the data input into the first account;
upon determining that the second account includes data which matches the data input into data fields of the first template form within the threshold, execute the synchronization action to generate a new synchronization field in a data structure included in the second account in order to synchronize and share selected data from the data input between the first account and the second account;
insert the shared selected data from the first template form into the new synchronization field within the second account;
in response to the shared selected data being inserted into the new synchronization field, programmatically generate a new, stand-alone template in the second account and configure the new template as a different template than the first template form;
populate the new template with the shared selected data from the new synchronization field that is shared from the first account;
populate the new template with additional content to generate and configure the new template as the different template than the first template form:
upon generating the new template in the second account, execute the synchronization action to generate a second synchronization field within the first template form of the first account; and
populate the second synchronization field with information from the second account.

6. The computing system of claim 5, wherein the instructions to evaluate data associated with the plurality of accounts to identify matching data comprise instructions that cause the processor to:
evaluate the data input through the instance of the application to determine that the data input into the first template form corresponds to a purchase order for an item;
evaluate the data of the plurality of accounts to determine that data of the second account, based on matching within the threshold, indicates that the second account is selling the item; and
insert the selected shared data from the purchase order which includes contact information of the first account into the new synchronization field within the second account;
wherein the instructions to populate the new template with the additional content comprise instructions that cause the processor to:
populated the additional content into the new template including data that is different that the data input into the first template form.

7. The computing system of claim 6, wherein the instructions comprise instructions that cause the processor to:
insert information that the second account is selling the item and contact information of the second account into a second synchronization field within the first template form of the first account.

8. The computing system of claim 6, wherein the instructions comprise instructions that cause the processor to:
evaluate the data input to identify a requested quantity of the item; and
evaluate the data of the plurality of accounts to determine that data of the second account indicates that the second account is selling at least the requested quantity of the item.

9. The computing system of claim 5, wherein the instructions to parse and evaluate data associated with the plurality of accounts further comprise instructions that cause the processor to:
parse a second template form from one or more of the plurality of accounts to determine if the second template form includes data fields populated with data values which match, within the threshold, the data input into data fields of the first template form.

10. The computing system of claim 5, wherein the instructions to evaluate data associated with the plurality of accounts to identify matching data comprise instructions that cause the processor to:
evaluate the data input through the instance of the application to determine that the data input into the first template form corresponds to a sales order for an item;
evaluate the data of the plurality of accounts to determine that data of the second account, based on matching within the threshold, indicates that the second account is seeking to purchase the item; and insert the selected shared data from the sales order which includes contact information of the first account into the new synchronization field within the second account;

wherein the instructions to populate the new template with the additional content comprise instructions that cause the processor to:

populated the additional content into the new template including data that is different that the data input into the first template form.

11. The computing system of claim 10, wherein the instructions comprise instructions that cause the processor to:

insert information indicating that the second account is seeking to purchase the item and contact information of the second account into a second synchronization field within the first template form of the first account.

12. A computer-implemented method, the computer-implemented method involving a computing node comprising a processor, and the computer-implemented method comprising:

maintaining, by the processor, a plurality of accounts within a cloud computing environment, wherein a plurality of remote computers is provided with access over a network to the plurality of accounts through instances of an application hosted by the cloud computing environment, and wherein each account is isolated from accessing data of the other accounts;

in response to receiving a command from one of the plurality of remote computers to enable data synchronization between a first account and constructing a data synchronization condition specifying that a synchronization action will be triggered when data input into a first template form of the first account satisfies the data synchronization condition;

monitoring, by the processor, access by the one of the plurality of remote computers to an instance of the application accessing the first account to determine whether the data input into the first template form of the first account satisfies the data synchronization condition;

in response to the data synchronization condition being satisfied, triggering, by the processor, the synchronization action to parse and evaluate data associated with the plurality of accounts to identify a second account that includes data, which matches within a threshold, the data input into the first template form of the first account;

upon determining that the second account includes data which matches the data input into data fields of the first template form within the threshold, executing the synchronization action to generate a new synchronization field in a data structure included in the second account in order to synchronize and share selected data from the data input between the first account and the second account;

inserting the shared selected data from the first template form into the new synchronization field within the second account;

in response to the shared selected data being inserted into the new synchronization field, programmatically generating a new template, that is not a data record in a database, in the second account and configure the new template as a different template than the first template form;

populating the new template with the shared selected data from the new synchronization field that is shared from the first account;

populating the new template with additional content to generate and configure the new template as the different template than the first template form, upon generating the new template in the second account, execute the synchronization action to generate a second synchronization field within the first template form of the first account; and populate the second synchronization field with information from the second account.

13. The computer-implemented method of claim 12, further comprising:

determining that the data input into the first template form corresponds to the first account filing in a purchase order;

determining that the second account is selling an item or service requested by the purchase order, based on matching the data within the threshold; and generating the new template as a new sales order populated with the shared selected data from the purchase order and populated with the additional content that is different than the data input into the first template form.

14. The computer-implemented method of claim 12, wherein the cloud computing environment comprises a multi-tenant architecture, and wherein the plurality of accounts corresponds to tenants of the multi-tenant architecture.

15. The computer-implemented method of claim 12, further comprising:

determining that the data input corresponds to a specification that the first account has an interest in an item or service; and broadcasting the interest to one or more accounts of the cloud computing environment based upon the one or more accounts comprising data indicating an offering of the item or service.

16. The computer-implemented method of claim 12, further comprising:

enforcing a privacy restriction upon the synchronization action, wherein the privacy restriction specifies information of the first account that is allowed to be shared with other accounts and information of the first account that is not allowed to be shared with other accounts.

* * * * *